July 11, 1961
L. UBBELOHDE
2,991,614
FALSE TWISTING APPARATUS FOR PRODUCING
CRIMPED FILAMENTARY MATERIALS
Filed March 24, 1954
4 Sheets-Sheet 3
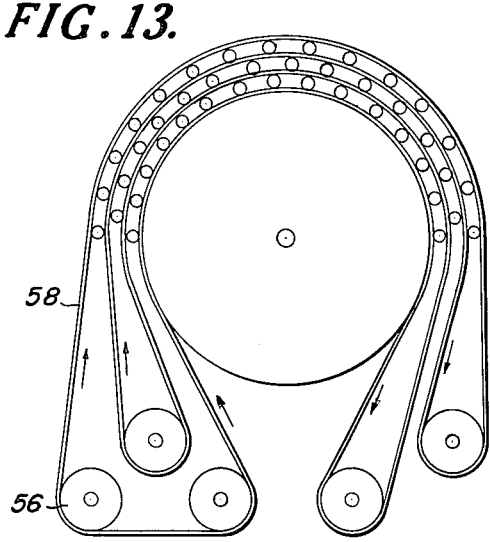
FIG. 13.
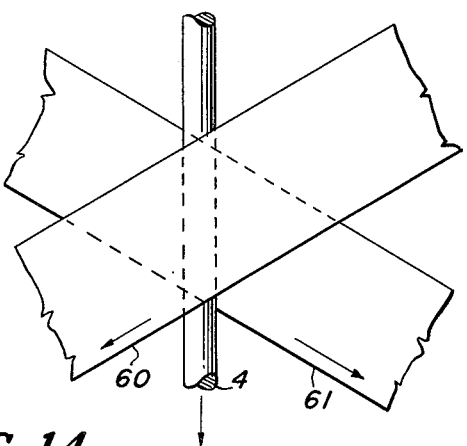
FIG. 15.
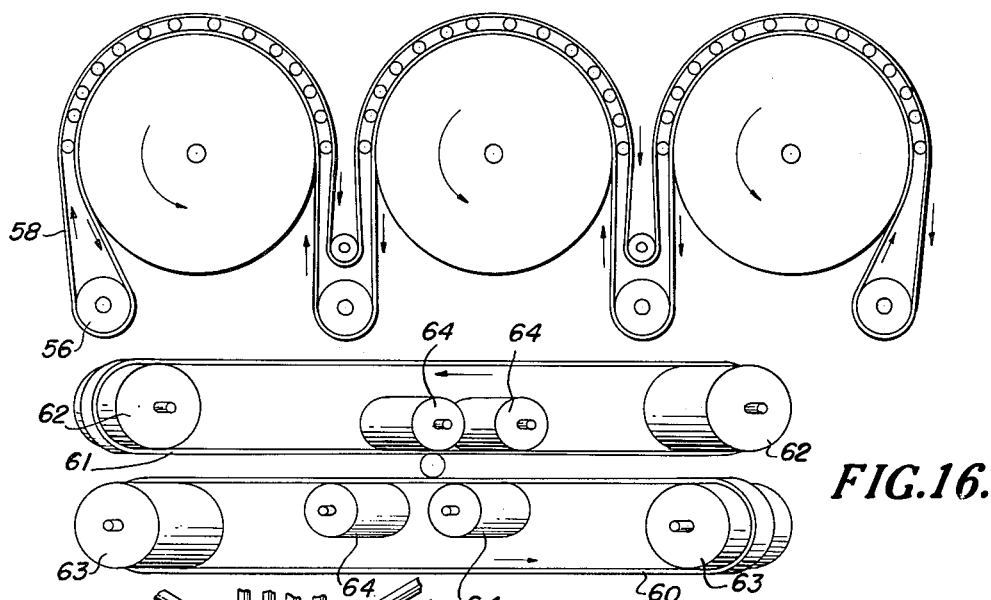
FIG. 14.
FIG. 16.
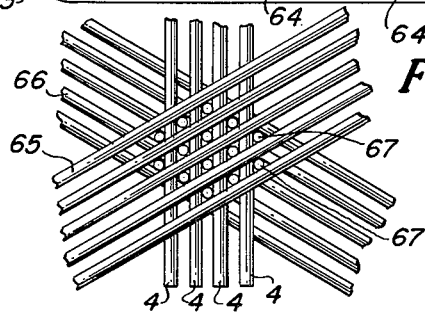
FIG. 17.
INVENTOR
Leo Ubbelohde
BY Fritz L. Hochwald
ATTORNEY

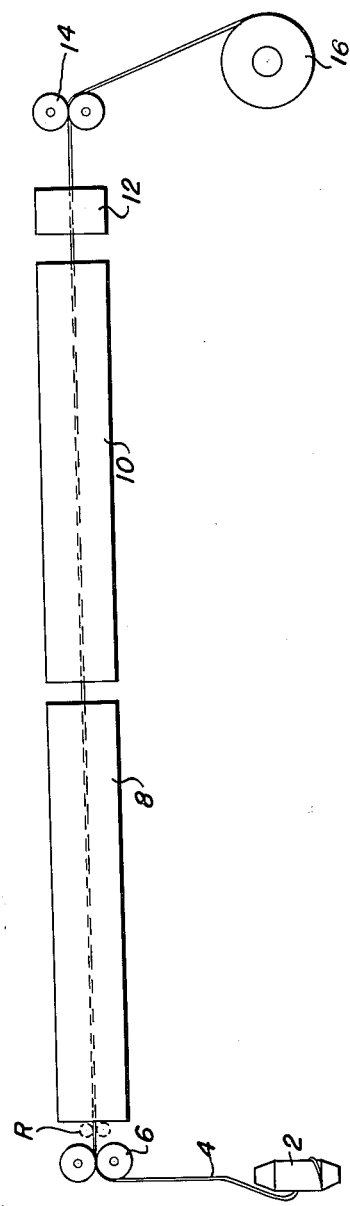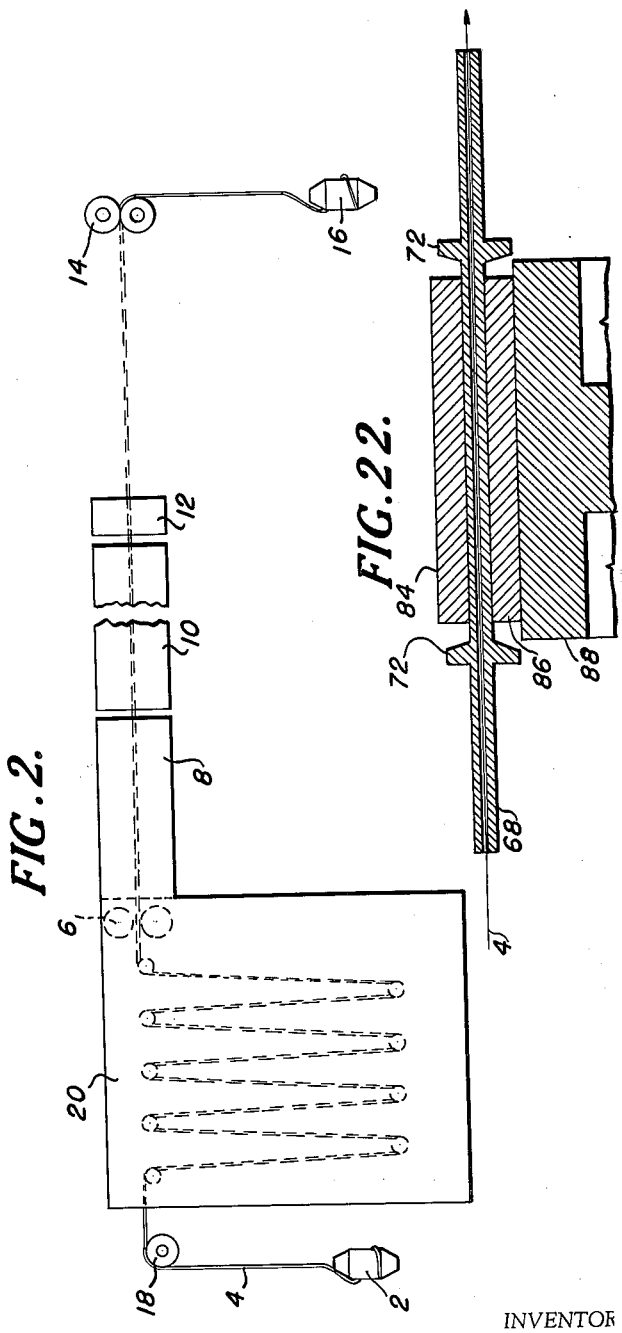

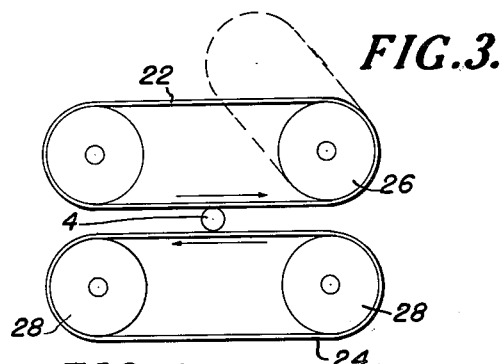
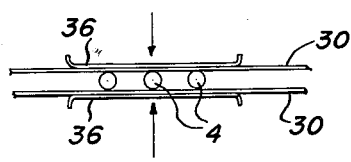
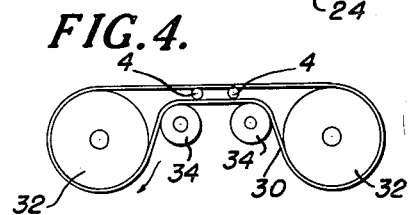
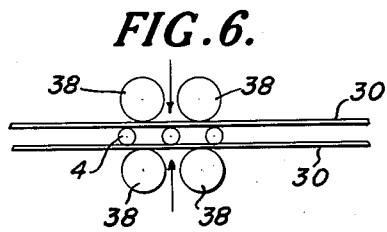
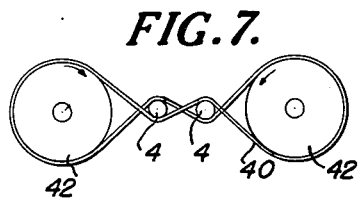
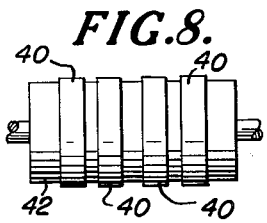
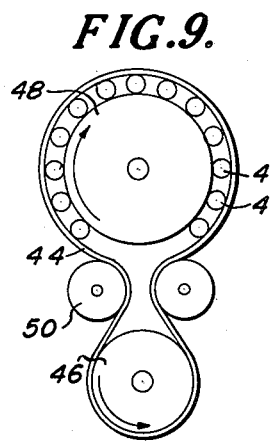
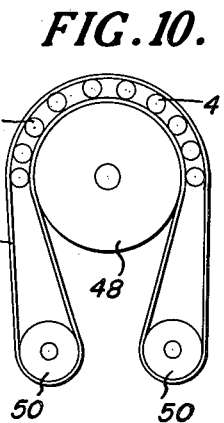
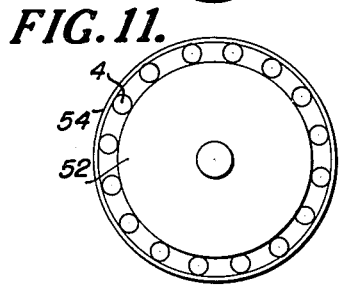
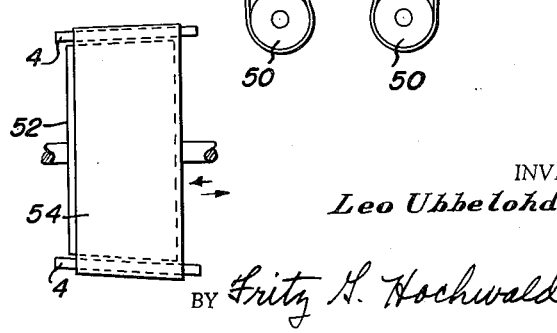

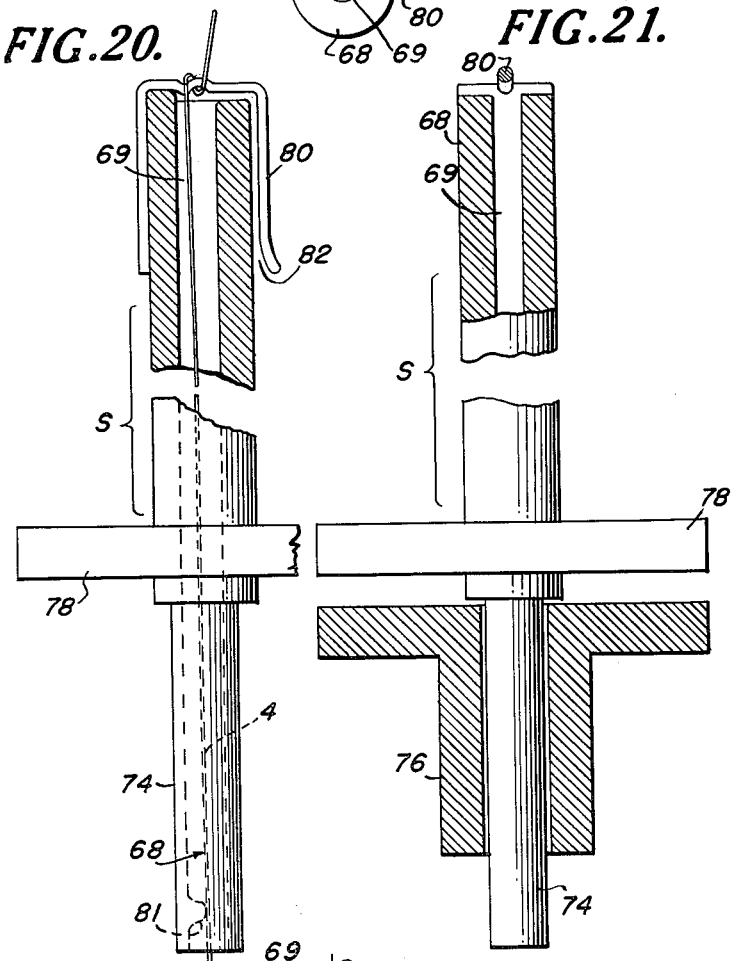

United States Patent Office 2,991,614
Patented July 11, 1961

2,991,614
FALSE TWISTING APPARATUS FOR PRODUCING CRIMPED FILAMENTARY MATERIALS
Leo Ubbelohde, 100 Lindemannstrasse,
Dusseldorf, Germany
Filed Mar. 24, 1954, Ser. No. 418,443
Claims priority, application Germany Mar. 25, 1953
17 Claims. (Cl. 57—34)

The present invention relates to a novel method and apparatus for producing crimped filamentary materials, i.e., filaments, yarns, and fibers, possessing highly desirable creping or elastic characteristics.

Numerous procedures have previously been proposed for crimping yarns and the like made from, for example, cellulose acetate, rayon, or nylon, in order to produce a fluffy, wool-like product. However, none of these prior crimping procedures have met with any significant success because of a number of disadvantages presented thereby which make it difficult, if not impossible, to obtain a commercially desirable product, i.e., one possessing a wool-like appearance and elastic or creping characteristics.

Accordingly, the principal object of the present invention is to provide novel improvements which eliminate the difficulties hitherto encountered in crimping yarns and other filamentary materials.

Another object of the invention is to provide a method which, in contrast to prior techniques, gives highly desirable crimped products and is otherwise peculiarly adapted for commercial operation.

Still another object of the invention is to provide novel improvements in apparatus for false twisting and crimping continuous bundles of filamentary materials.

Another object of the invention is to provide a novel method of particular value in producing crimped and otherwise desirable filamentary products from synthetic thermoplastic materials, such as nylon, although said method is not limited to use with such materials.

Further objects of the invention will be apparent from the detailed description of the invention which follows. However, it will be appreciated that this description is only given for illustrative purposes and is not intended to limit the scope of the invention as defined in the appended claims.

The foregoing objects are accomplished, at least in part, by a method which comprises the steps of first passing the filamentary material, such as filament nylon or nylon yarn, and preferably in the form of a continuous bundle, into a softening zone wherein said material is softened, then passing this softened material into a setting zone wherein twist imparted to said material, as hereinafter defined, is set, thereafter imparting false twist to the set material so that the false twist runs back along said material through the setting zone and is received by the material in the softening zone, removing the false twist from the bundle and collecting the latter, preferably under tension.

The present method, as broadly described above, produces remarkably desirable crimped products. This is particularly true when the material thus treated is nylon in which case the products obtained have excellent creping and elastic characteristics and otherwise very closely resemble wool.

The success of the present method is due, at least to a significant extent, in the surprising discovery that the difficulties of the prior art can be avoided by false twisting the material after it has been set but in such a way that the twist actually goes into the material while it is in the softened state. The exact reason for the improvement thus obtained is not fully understood; but in any event, it is clear that the sequence of operations, i.e., softening, setting, and false twisting with the twist going back through the setting zone and into the softening zone. is critical and gives a substantially different product from that previously obtained with other procedures involving softening, twisting, and setting steps.

The various aspects of the invention will be more fully understood by reference to the accompanying drawings wherein:

FIGURE 1 is a diagrammatic view of one arrangement for carrying out the method of the present invention;

FIGURE 2 shows a modification of the arrangement of FIGURE 1;

FIGURES 3 through 17 are schematic showings of various arrangements for false twisting filamentary material according to the invention;

FIG. 3 shows a device where a bundle of filaments or a twisting tube is rolled between two belts driven in opposite directions;

FIGS. 4, 5, and 6 show a similar device where the rolling movement is effected by the two runs of a single belt;

FIG. 7 shows a device using a plurality of belts driven by rollers for twisting a plurality of filamentary bundles;

FIG. 8 is a plan view of the right hand roller of FIG. 7, showing the parallel arrangement of the belts;

FIG. 9 shows an embodiment of the invention where a plurality of filamentary bundles or twisting tubes are rolled between a roller and a belt;

FIG. 10 shows a modification of the device illustrated in FIG. 9, where the bundles or tubes are rolled between the two runs of the single belt;

FIGS. 11 and 12 are a front view and a side view of a device where the bundles or twisting tubes are rolled between a conical roller and ring;

FIGS. 13 and 14 are modifications of the same principle as used in FIGS. 9 and 10 for placing a larger number of bundles or tubes between the two runs of a belt;

FIGS. 15, 16 and 17 show a modification of the device of FIG. 3, where the two belts do not run parallel but at an angle to each other;

FIGURE 18 is a perspective view, partially in section, of novel twisting means adapted for use in any of the false twisting arrangements shown in FIGURES 3 to 17;

FIGURE 19 is a fragmentary perspective view of the twisting means shown in FIGURE 18;

FIGURE 20 is a fragmentary view, partially in section, of another form of twisting means adapted for use in the arrangements shown in FIGURES 3 to 17;

FIGURE 20a is a plan view of the twisting means of FIGURE 20;

FIGURE 21 is another fragmental view, partially in section, of the twisting means of FIGURE 20;

FIGURE 22 is a fragmental elevational view, partially in section, of further twisting means; and FIGURE 23 is a diagrammatic view of another feature of the invention.

Referring more specifically to the drawings, the arrangement of FIGURE 1 includes a spool or bobbin 2 from which a continuous bundle, or the equivalent thereof, of filamentary material 4 is supplied to a pair of driven feed rolls 6. From the latter, bundle 4 is drawn sequentially through a softening or plasticizing zone 8 and a setting zone 10 and then to twisting means 12 where false twist is imparted in such a way that the twist runs back through zone 10 and is received by the softened material in zone 8.

From twisting means 12, the bundle 4 is drawn through a pair of driven rolls 14 and taken up, preferably under tension, on a collecting spindle or spool 16. To avoid possible slippage of the bundle as it passes through the several treating zones, three rolls 14, rather than the two shown in FIGURE 1, may be utilized. In any event, however, the portion of bundle 4 passing between twisting means 12 and rolls 14 is twisted in a direction opposite to the twist given that part of bundle 4 which is positioned between rolls 6 and twisting means 12. Accordingly, by appropriately positioning rolls 14, the false twist is completely removed, or substantially so, by the time it leaves rolls 14. However, the individual fibers, filaments, or yarns making up the bundle retain the corkscrew shape produced by setting the false twist therein even though the bundle itself loses the false twist imparted thereto. Hence, bundle 4, as collected on spindle 16, is much more voluminous and elastic than it was when originally fed from spindle 2.

As indicated, bundle 4 is preferably taken up on collecting spool 16 under tension since this gives a better final product. Tension amounting to 0.25 to 0.5 gram per denier has been found especially effective.

It is also desirable in some cases to stretch bundle 4 between the rolls 6 and 14 since the resulting elongation effects a surprising increase in the resiliency or elasticity of the crimped product. This can be accomplished by operating rolls 14 at a somewhat greater speed than rolls 6. The degree of such stretch can be widely varied but, generally speaking, an elongation of from 3 to 9% of the original length is sufficient to give the desired results.

The nature of the softening and setting treatments utilized in zones 8 and 10, respectively, depends to a large extent upon the filamentary material undergoing treatment. For example, if the material is thermoplastic, as in the case of nylon and like synthetic thermoplastic polymers, it may be softened in zone 8 by heating to a temperature sufficient to plasticize the same. Thus, with filament nylon or nylon yarns, the desired softening is obtained by heating the air immediately surrounding the yarn to temperatures of at least 180° C. and subjecting the yarn to such temperatures for a sufficient length of time for softening to take place. Temperatures substantially below 180° C. fail to plasticize nylon and the resulting products, while showing a somewhat crimped and fluffy appearance, do not posses desirable elastic and creping characteristics.

With nylon or like material, it is desirable to have sufficient mositure present in softening zone 8 to prevent oxidation which is apt to occur at the elevated temperatures used for softening, if movement of the bundle through the zone is halted for some reason. Accordingly, it is preferred to use heated air containing added water vapor by introducing small amounts of water into softening zone 8. Dry heat, such as hot air, can also be used if special precautions are taken to avoid damaging the bundle. Hot non-oxidizing gases are also suitable for effecting the desired softening.

High frequency or infra-red waves may also be used for heating the bundle, especially in those cases where only limited operating space is available. Further alternatives includes the use of gaseous or liquid chemical softening agents, such as alkaline swelling agents or even water, which should be removed in setting zone 10. Additionally, in cases where the material is sufficiently plastic when spun, the plastic material may be fed directly into the setting zone 10.

The method of the invention is broadly applicable to any filamentary material, i.e., filaments, fibers, and yarns, which can be softened and subsequently set with a twist therein. Preferably, but not necessarily, the material is treated in the form of a continuous bundle. Thus, as indicated above, the invention can be used with continuous bundles of viscose and cuproammonium yarns, filaments, or fibers. Filamentary bundles of Perlon L (nylon 6) or the various cellulose esters such as cellulose acetate may also be treated according to the invention. Most important of all applications, however, is the treatment of nylon, i.e., synthetic linear polyamides, of the type described in the Carrothers Patents Nos. 2,071,250; 2,071,251; and 2,071,253.

Operating details such as temperature and time of treatment in zones 8 and 10 can be varied and are governed by such factors as the nature of the material treated and the manner of softening and setting. However, it can be stated that when bundles of nylon or like filaments and yarns are treated, suitable softening results if the bundle is kept at a temperature of between 180° C. and 220° C., and preferably 200° C. to 210° C., in zone 8 for a period of from 3.5 to 11 seconds. As for the setting or resolidifying operation, this is preferably accomplished by cooling the bundle to a temperature of the order of 0° C. in zone 10. However, satisfactory results may also be obtained by setting at temperatures ranging from 0° C. to 25° C., and even lower, provided the periods of exposure are regulated according to the temperatures utilized. Usually, the material is sufficiently set if kept at a temperature of 0° C. to 25° C. for a period of from 3.5 to 11 seconds, before going into the twisting means.

If desired, the bundle may be preheated before passing into zone 8 by, for example, the arrangement shown in FIGURE 2. This arrangement is similar to that shown in FIGURE 1 except that it includes, between spindle 2 and feed rolls 6, a guide roll 18 and chamber 20 in which the bundle can be preheated before passing into zone 8.

The amount of twist given the bundle by false twist means 12 can be varied over a relatively wide range. Generally speaking, however, it has been found that from 40 to 150 turns per inch give desirable results depending on the denier. Thus, for example, 80 to 110 turns per inch are satisfactory for a 30 or 40 denier bundle; 40 to 50 turns per inch for a 200, 210, or 260 denier bundle; and 60 to 100 turns per inch for a 70 denier bundle.

Filamentary bundles of any denier, for example, 30 to 260 denier, can be treated according to the invention. However, the thinner the bundle, i.e., the lower the denier, the more twist required to obtain the desired crimp, as evidenced by the data given in the preceding paragraph.

Various modifications, in addition to those already referred to, can be made in the present method. For instance, a plurality of bundles, of the same or different material, can be simultaneously treated even though only a single bundle is shown in FIGURES 1 and 2. In addition, the crimped product collected on spindle 16 can be further twisted in the opposite direction to give an even fluffier and voluminous material.

The bundle or bundles may be fed through the various treating zones (softening, setting, and twisting), either in a horizontal or vertical direction. However, it is essential that the bundle travel rectilinearly and unsupported through these zones in order to avoid any interference with the running back of the twist unless additional twisting means are provided along the path of travel. In other words, the direction of the path of the bundle should not be changed in the absence of equivalent twisting means on both sides of the point where the direction change occurs.

The false twisting means 12 may be a rotatable twisting tube including interior studs, projections, or rolls which cause the filamentary bundle passing therethrough to rotate therewith. However, such twisting tubes are not particularly desirable for use in the present invention since they cannot be satisfactorily operated at speeds greater than 100 revolutions per second due to the fact that at higher speeds, friction in the bearings and the speed of the driving ropes or belts become too great. Consequently, to produce the high degree of false twist necessary to obtain the desired crimp, the bundle must be drawn through these tubes at such very low speeds as to be commercially impractical.

Accordingly, the present invention also includes various novel means, shown in FIGURES 3 to 17, which make it possible to impart a high degree of false twist to the bundle in a very short period of time. Thus, by using any one of these means, or combinations thereof, the bundle can be processed in a quick and otherwise commercially satisfactory manner.

Broadly stated, the twisting arrangements of FIGURES 3 to 17 include a pair of spaced belt runs or the like, movable at equal speeds in opposite directions and between which the bundle 4 is drawn, e.g., by the rolls 14 of FIGURES 1 and 2, in a direction normal to the movement of the belts. The latter are so spaced that when they are in motion, they effect a rolling or twisting action on the bundle by frictional contact with either the bundle itself or a twist tube of minimum diameter through which the bundle is drawn. In this way, the distance between the belt surfaces and the axis of the bundle is kept to a minimum with the result that a maximum amount of twist is obtained in as short a time as possible.

Preferred structures for the twist tube referred to in the preceding paragraph for use in effecting the desired twisting action upon the bundle, or bundles, are hereinafter discussed in detail. Accordingly, for the present, it need only be mentioned that such tubes need not be supported and hence can be extremely thin-walled and of very small diameter, i.e., of the order of 2 to 3 mms. Hence, even relatively slow belt speeds can give a high number of tube revolutions, e.g., 140,000 to 200,000 r.p.m. and higher, thus insuring rapid and otherwise satisfactory twisting of the bundle.

Referring more specifically to the drawings, the twisting arrangement shown in FIGURE 3 comprises two endless belts 22 and 24 mounted about a pair of rolls 26 and 28, respectively. These rolls 26 and 28 are driven in conventional manner so as to effect movement of belts 22 and 24 in opposite directions as shown by the arrows. Such movement of the belts in turn exerts a rolling or twisting action on bundle 4 as it is drawn between the the belts in a direction normal to the belts. It will, of course, be appreciated that the bundle in FIGURE 3, as well as FIGURES 4 to 17, may be passed through a twisting tube, which is driven by contact with the belts, in the manner previously discussed. Insertion of the bundle alone, or bundle with twisting tube, between belts 22 and 24 may be effected by removing a belt from one of its supporting rolls, as shown by the broken lines of FIGURE 3.

FIGURE 4 shows a bundle twisting arrangement using two runs of a single endless belt 30 driven in the direction of the arrows by one, or both, of the rolls 32 for the purpose of twisting a plurality of bundles 4. With this particular arrangement, it is desirable to include a pair of displaceable or movable rolls 34 which serve to equalize the pressure on bundles 4 as the latter pass between the runs of belt 30. In lieu of pressure rollers 34, there may be used a pair of oppositely disposed plate members 36 (as shown in FIGURE 5) or cooperating idler rolls 38 (FIGURE 6) urged against belt runs 30 in the direction of the arrows.

FIGURES 7 and 8 are illustrative of an arrangement for twisting more than one bundle using a plurality of belts. In this particular embodiment, four belts 40 are shown (FIGURE 8) with two bundles 4 although it will be appreciated that any number of belts and bundles may be satisfactorily employed.

As shown in FIGURE 8, the belts 40 are disposed side by side about rolls 42 and are so arranged that one run of each belt passes under one bundle and over the other bundle while the oppositely moving run of the same belt passes over the first bundle and under the second. In this way, movement of the belts by means of one or both of the rolls 42 in the direction of the arrows shown in FIGURE 7 brings about the desired rolling and twisting of the bundles.

The modification of FIGURE 9 includes an endless belt 44, driven by a roll 46, and another roll 48, driven in a direction opposite to that of the belt as shown by the arrows. The bundles 4 are passed between belt 44 and roll 48 and twisted thereby. A pair of rolls 50 acting against belt 44 serves to hold bundles 4 against roll 48 so as to insure proper twisting.

The arrangement of FIGURE 9 can be further modified, as shown in FIGURE 10, to eliminate the belt-driving roll 46. This is accomplished by guiding belt 44 about the rolls 50, at least one of which serves to drive the belt, and so positioning the belt with respect to roll 48 that the inner run of the belt directly contacts roll 48 and moves in a direction opposite to the outer run. The two belt runs, moving in opposite directions, can thus be used to twist a plurality of bundles 4 positioned therebetween. The advantage of this particular arrangement, or the equivalent thereof, where a single belt is used, is that the two belt runs which contact the tube have exactly the same speed in opposite directions.

The construction of FIGURES 11 and 12 includes a driving roll 52, the outer surface of which is slightly tapered, as best shown by the broken lines in FIGURE 12. Positioned about this roll 52 is a collar or a ring 54 whose inner surface is also tapered to correspond with the outer surface of roll 52. Collar 54 and roll 52 can be driven in opposite directions by conventional means so as to twist the several bundles 4.

As a further modification, roll 52 may be mounted for axial movement as shown by the arrows in FIGURE 12. In this way, the distance between roll 52 and ring 54 can be adjusted as desired so as to regulate the pressure on the bundles, or the tubes containing the same.

The modifications shown in FIGURES 13 and 14 are similar to the arrangement of FIGURE 10 except that the former include more rolls 56 so as to obtain an increased number of twisting positions with a single endless belt 58 driven in the direction shown by the arrows.

Inasmuch as the belt surfaces or the like used to twist the bundle move at equal speeds in opposite directions, the axis of the bundle or tube containing same should theoretically also remain in the same position. However, in actual practice, it is usually necessary to utilize some sort of guide means, e.g., pins, combs, forks, rolls, or the like, to prevent axial displacement of the bundles. In addition, it has been found that when tubes are used, a slight pull is exerted thereupon in an axial direction due to the drawing of the bundles therethrough. Accordingly, it is also desirable to include retaining means on these tubes in order to avoid any displacement thereof. This particular feature is more specifically discussed below.

As the bundles 4 are pulled through the twisting means shown in FIGURES 3 to 14, there is some tendency for the twisting surfaces to hold the bundles back. This difficulty can be overcome by increasing the pull on the bundle but it is undesirable to do this because it tends to remove or uncoil some of the twist given the bundle.

It has been found, however, that this holding back of the bundle can be satisfactorily avoided by positioning the belt runs in the manner of FIGURE 15, i.e., angularly with respect to each other, rather than parallel. In this way, movement of belt runs 60 and 61 in the directions indicated in FIGURE 15 not only rolls or twists bundle 4 but also exerts a resultant pull thereon in the same direction as the bundle is drawn, the extent of the pull being adjustable, as desired, by varying the angular disposition of belt runs 60 and 61. Stretching of the bundle for the purpose of increasing the elasticity or resilience of the crimp may also be effected in this way.

The belt arrangement of FIGURE 16 further illustrates the above-discussed feature of angularly positioning belts 60 and 61 with respect to each other. In this instance, however, the endless belts 60 and 61 are shown mounted for opposed movement on angularly disposed rolls 62 and 63, respectively, with the rolls 64, also angularly positioned, serving the same function as rolls 38 in FIGURE 6.

Where several bundles 4 are twisted side by side as shown, for example, in FIGURES 13 and 14, comb-like guides may be provided before or behind the belts to avoid entanglement. As an alternative, a plurality of relatively narrow belts 65 and 66 may be used, as shown in FIGURE 17, in conjunction with filament guides 67 positioned wherever belts 65 and 66 intersect.

FIGURES 18 and 19 illustrate a preferred form of twist tube 68 for use with the belt runs or like twisting surfaces of FIGURES 3 to 17. Specifically, twist tube 68 includes a bore 69 extending axially therethrough and transverse bores 70 intersecting the axial bore adjacent each end of the tube. Tube 68 can be made of any suitable material, preferably metal, and as shown, has a pair of spaced collars 72 rigidly affixed thereto for a purpose described hereinafter.

FIGURE 19 illustrates the manner in which a bundle 4 is threaded through tube 68 so as to be rotatable therewith and at the same time sufficiently free to be drawn therethrough without any excessive pull which would destroy the twist therein. As shown, bundle 4 is passed in the direction of the arrows into the open end of the axial bore 69, outwardly through an open end of transverse bore 70, approximately half way around the outer surface of tube 68, back into the tube through the other open end of the transverse bore 70 and then through axial bore 69 and out the opposite end of tube 68 to the rolls 14 and collecting spindle 16 of FIGURE 1. The bundle need not be looped through the transverse bore at the exit end of the tube and, in fact, this additional bore may be omitted. It is preferred, however, to provide the tube with a transverse bore at each end so that the tube might be reversed should one of these bores wear out.

The outer diameter of tube 68 can be widely varied. However, as previously indicated, it should preferably be kept at a convenient minimum, e.g., 2 to 3 mms., since the larger the tube diameter, the greater the belt speed must be in order to obtain a given number of tube revolutions.

The diameter of bores 69 and 70 can also be varied depending upon the nature and strength of the material from which the tube is made. To simplify the threading operation, it is preferred that the transverse bores 70 should be located as close to the end of the tube as possible, e.g., 1.6 to 2 mms. from the tube end, although this is not absolutely essential.

The invention as described above is further illustrated, but not limited, by the following example:

A number of bundles of nylon yarns (70/½/34 S.D. nylon T-200) were taken off supply spindle 2 by rolls 6 under tension of 3 to 4 grams and fed into softening zone 8 at the rate of 100 feet per minute, although yarn speeds anywhere within the range of 50 to 135 feet per minute could be used with equivalent results. Softening zone 8 was maintained at a temperature of between approximately 200 and 215° C. by feeding steam into zone 8 in the same direction as the yarn. As an alternative, the yarn and steam may be fed into zone 8 in opposite directions. However, it is preferred to have the steam and yarn enter and leave zone 8 in the same direction since, in this way, incoming steam first contacts the yarn while the latter is relatively cold and thus in better condition to withstand any excessive temperature which the steam might temporarily have. It is also preferred, in order to obtain results of optimum uniformity, particularly where there are a plurality of bundles, that the steam or other heating medium be fed to zone 8, and withdrawn therefrom, in such a way that the flow within zone 8 is actually normal to the direction of travel of the bundle, and the heating medium circulates evenly throughout the zone so that all the bundles therein are exposed to substantially the same conditions of heat.

At the designated yarn speed, the bundles passed through the softening zone 8 in about eight seconds and were then fed directly into the setting or cooling zone 10, which in this case, was a chamber through which air at 20° C. was circulated, preferably as in the heating stage, at a direction normal to the travel of the bundles. After being subjected to such temperature for about eight seconds, the bundles were fed to the twisting means 12, which in this case, corresponded to the arrangement shown FIGURE 10. For this operation, each bundle was threaded through a twisting tube of the type shown in FIGURE 18. Belt speed was adjusted so that the twisting tubes were rotated at about 96,000 r.p.m. thereby imparting approximately 80 turns per inch of false twist in the Z-direction to the bundles. Under these conditions, it was observed that the twist ran back through the setting zone and was actually being received by the bundle in its heated state in zone 8.

From the twisting means 12, the bundles were drawn between rolls 14 and collected, under a tension of about 10 grams, on spindle 16. Rolls 14 were driven at a speed sufficiently greater than that of feed rolls 6 to apply a stretching tension of approximately 70 to 100 grams on each bundle. This resulted in about an 8% of stretch of the bundles. The final product, as collected on spindle 16, possessed an extremely desirable crimp and a fluffy, wool-like appearance.

In operation, it is surprising that friction between contacting parts, e.g., the tubes, belts, or other twisting means and retaining or guide means, normally does not produce any significant amount of heat. However, if any localized heating does occur because of friction, this can be avoided by circulating air between the contacting parts. Accordingly, FIGURES 20, 20a and 21 show a twist tube structure which is specifically adapted for effecting circulation of air about the tube to avoid any possible overheating. As shown therein, tube 68 includes a reduced end portion 74 which fits loosely within a bearing member 76 preferably of material softer than the tube, e.g., pressboard. Tube 68 is also provided with a disc member 78 which is rigidly affixed thereto adjacent end portion 74. Therefore, when tube 68 is rotated by suitable belt means frictionally engaging surface S thereof, disc 78 is likewise rotated and exerts a centrifugal effect on the air between it and bearing 76. As a result, air is constantly drawn into the clearance between the bearing and end portion 74 and expelled outwardly between the bearing and disc 78, thus bringing about a cooling action. In addition, this arrangement avoids direct contact between bearing 76 and tube end portion 74, on the one hand, and bearing 76 and disc 78, on the other.

If additional cooling should be required, compressed air may be injected at any convenient location, for example, between disc 78 and bearing 76, or through the bore of bearing 76.

The twisting tube shown in FIGURES 20, 20a, and 21 also includes novel threading means which insure that the bundle is introduced axially into the tube so as to avoid the possible formation of antinodes which, at the high speeds attainable by the tube, might break or tear the bundle. To this end, the tube 68 of FIGURES 20, 20a, and 21 includes a finger member or wire 80 of steel, or like material, an end of which is affixed to one side of the tube. This finger member or wire 80 projects outwardly, with an S-shaped curvature, across the end of tube 68 and then backwardly with a free end adjacent the other side of tube 68. Thus, when bundle 4 is looped about wire 80 in the manner shown in FIGURE 20, it is axially arranged with respect to the tube (see FIGURE 20a) and, therefore, free from any tendency to form antinodes. This is particularly true if the bore 69 is also provided with a lug or projection 81 to compensate for any possible deviation from the axis caused by looping the bundle about wire 80. This particular tube structure also offers the advantage, over the structure of FIGURES 18 and 19, of being substantially easier to thread since the bundle can be readily inserted at 82.

FIGURES 18 and 22 disclose a further feature of the invention, namely, means for retaining the tubes in position while at the same time avoiding frictional heating. More specifically, reference has previously been made to the collar members 72 which, as shown in FIGURE 22, straddle the two belt runs 84 and 86. The latter, with supporting roll 88, functions to rotate the tube in the manner above described. As shown, each of the collar members 72 is provided with a tapered side facing inwardly towards belts 84 and 86. Consequently, if the tube should be pulled along with the bundle 4, the rear collar member 72 is ultimately brought to bear against the edge of the belts 84 and 86, thus preventing any further axial movement of the tube. It has been found that contact between the collar member 72 and the belts does not cause any undesired heat to be developed since the belts and collar member rotate at the same speed. Furthermore, the belts constantly contact different points on the collar member so that air adjacent thereto can effect whatever cooling is necessary.

The front collar member 72 primarily serves to prevent the tube from slipping out from between the belts. In addition, provision of two collar members makes it possible to reverse the tube if one of these members should wear out through continued contact with the belts.

A further feature of the invention, designed to avoid entanglement of the broken ends of a bundle with other bundles being simultaneously treated, is shown in FIGURE 23. This feature is particularly suitable for use in the softening or plasticizing zone 8 where, if a bundle should break due, for example, to the tension exerted thereupon, the broken ends of the bundle might uncoil because of their twisted conditon and become entangled with adjacent bundles, thus causing further breakage and even discontinuation of the process. Accordingly, the embodiment of FIGURE 23 comprises a stationary comb 83 whose teeth 84 separate each bundle 4 from the others and are so spaced that they do not contact the bundles at all, or only occasionally, in order not to disturb the backward run of the twist. A plurality of such combs 83 should be provided at close intervals, preferably along the entire path travelled by the bundles. The exact spacing of these combs can be varied, depending on the various operating factors such as denier of the bundles, and twist. As an illustration, however, it can be mentioned that, when using the twisting means of FIGURE 10, satisfactory results are obtained by spacing the combs about 3 cms. apart with a bundle or tube spacing (from axis to axis) of 6 cms.

It will be appreciated that when a bundle breaks in the process of the invention, one end of the bundle is ultimately withdrawn from the system by virtue of rolls 14 and collecting spindle 16. Hence, if combs are used as described above, this particular end of the bundle can be taken up without any further damage. However, the other end of the broken bundle can cause considerable difficulty because it might wind itself up on one of the rolls 6, thus forming a bulge which ultimately throws the rolls out of proper engagement with each other. As a result, the uniformity of the feed of other bundles supplied to zone 8 by these same rolls is destroyed and further breakage is apt to occur. Ultimately, it could even be necessary to stop the process entirely and this, of course, is undesirable, particularly since bundles left standing in zone 8 might be very badly damaged.

However, the abovementioned difficulty can be overcome, according to the invention, by inserting additional rolls R (shown in broken lines in FIGURE 1) between rolls 6 and zone 8. The loose ends of bundles that are no longer under tension thus wind themselves up on rolls R instead of feed rolls 6.

In lieu of the rolls R, suction means (not shown) may be interposed between feed rolls 6 and zone 8 in such a way as to withdraw broken bundle ends. One additional advantage of using such suction means is that it permits the broken bundle to be cut in front of the rolls 6, thus preventing further feed of the broken bundle.

It will be understood that the foregoing description is given by way of illustration only. In other words, various additional modifications may be made therein without departing from the invention. For example, the crimped product taken up on collecting spindle 16 may be again subjected to the crimping process of the invention or treated in some other way, such as by being combined with another crimped product. Hence, the scope of the invention is to be determined from the appended claims.

This application is a continuation-in-part of my copending application Serial No. 349,285, filed April 16, 1953, now Patent No. 2,863,280.

I claim:

1. Twisting apparatus comprising a pair of closely spaced, opposed belts, means for moving said belts in opposite directions and at equal speeds, and at least one twisting tube positioned between said belts, said tube being supported solely by said belts and being rotatable by movement thereof.

2. The apparatus of claim 1 wherein said opposed belts are angularly disposed with respect to each other.

3. The apparatus of claim 1 including means urging said belt surfaces against said material.

4. The apparatus of claim 1 including means for retaining said tube between said belts.

5. Twisting apparatus comprising a pair of closely spaced opposed belt runs of a single, endless belt, means for moving said belt runs in opposite directions, and at least one twisting tube positioned between said belt runs, said tube being supported solely by said belt runs and being rotatable by the movement thereof.

6. The apparatus of claim 1 including means for circulating air between said tube and surfaces to avoid overheating.

7. A twisting tube rotatable by belt means for the purpose of imparting false twist to filamentary material, said tube being of relatively small outer diameter and having a bore extending axially therethrough and a second bore extending transversely therethrough and intersecting said axially extending bore adjacent an end of said tube.

8. A twisting tube rotatable by belt means to impart false twist to filamentary material, said tube being of relatively small outer diameter and having a bore extending axially therethrough, a transverse bore intersecting said axially extending bore adjacent at least one end thereof, and collar means intermediate its ends forming with said tube a belt-contacting and retaining zone for effecting rotation of said tube without axial displacement thereof.

9. A twisting tube rotatable by belt means to impart false twist to filamentary material, said tube being of relatively small outer diameter and having a bore extending axially therethrough, a transverse bore intersecting said axially extending bore adjacent each end thereof and a pair of collar members spaced along the outer surface of said tube and inwardly of said transverse bores for preventing axial displacement of said tube when rotated.

10. A false twisting apparatus comprising a pair of belt runs movable in closely spaced, parallel relationship at equal speed and in opposite directions, and at least one filament twisting tube of relatively small diameter between said belt runs and supported solely thereby, said tube being rotatable by direct contact therewith and having a bore extending axially therethrough, a transverse bore intersecting said axially extending bore adjacent at least one end thereof, and collar means intermediate its ends forming a belt retaining zone permitting rotation of said tube without axial displacement thereof.

11. The apparatus of claim 5 including a plurality of said tubes in parallel and spaced relationship between said opposed belt runs for simultaneous twisting of a plurality of filamentary bundles, and means for preventing entanglement of said bundles, said last named means including at least one comb, the teeth of which separate said bundles.

12. The apparatus of claim 1 including a plurality of said tubes in parallel and spaced relationship.

13. The apparatus of claim 1 including means for varying the space between said belts.

14. A twisting tube rotatable by belt means to impart false twist to filamentary material, said tube being of relatively small outer diameter and having a bore extending axially therethrough, a transverse bore intersecting said axially extending bore adjacent each end thereof and a pair of collar members spaced along the outer surface of said tube and inwardly of said transverse bores, each of said collar members having an inwardly facing tapered side for preventing axial displacement of said tube when rotated.

15. A false twist spindle comprising a shaft having a bore extending longitudinally therethrough into one end of which a yarn to which a false twist is to be applied is threaded, an additional bore extending from the longitudinal bore to the exterior of the shaft through which the yarn is threaded from the longitudinal bore to the exterior of the shaft, and a second additional bore extending from the exterior of the shaft to the longitudinal bore through which the yarn is threaded from the exterior of the shaft back to the longitudinal bore and to the other end of the longitudinal bore.

16. A false twisting device comprising a pair of closely spaced opposed runs of a single belt, means for moving said runs in opposite directions at equal speeds, twisting tubes of relatively small diameter positioned between said belt runs and being rotatable by the movement thereof, spaced collar members on said tubes on opposite sides of said belt runs to restrict axial movement of said tubes, and means restricting movement of said tubes in direction of the belt movement.

17. A false twisting device comprising a pair of closely spaced opposed runs of a single belt, means for moving said runs in opposite dirmections at equal speeds, twisting tubes of relatively small diameter positioned between said belt runs, said tubes being supported solely by said runs and being rotatable by the movement thereof, and guide rolls forcing said belt runs, in the space intermediate said tubes, closer together than the width of said tubes.

References Cited in the file of this patent

UNITED STATES PATENTS

| | | |
|---|---|---|
| 135,015 | Skinner | Jan. 21, 1873 |
| 2,098,974 | Repass | Nov. 16, 1937 |
| 2,107,004 | Kaufman | Feb. 1, 1938 |
| 2,111,209 | Dreyfus | Mar. 15, 1938 |
| 2,244,832 | Finlayson et al. | June 10, 1941 |
| 2,262,589 | Peck | Nov. 11, 1941 |
| 2,463,618 | Heberlein et al. | Mar. 8, 1949 |
| 2,475,922 | Stockly | July 12, 1949 |
| 2,557,104 | Hegedus | June 19, 1951 |
| 2,590,374 | Brown | Mar. 25, 1952 |
| 2,620,517 | Schlums | Dec. 9, 1952 |

FOREIGN PATENTS

| | | |
|---|---|---|
| 332,424 | Germany | Jan. 29, 1921 |